(12) United States Patent
Sharma et al.

(10) Patent No.: US 8,359,429 B1
(45) Date of Patent: Jan. 22, 2013

(54) SYSTEM AND METHOD FOR DISTRIBUTING VOLUME STATUS INFORMATION IN A STORAGE SYSTEM

(75) Inventors: Gopal Sharma, San Jose, CA (US); Richard Gorby, Portland, OR (US); Santosh S. Rao, Santa Clara, CA (US); Aseem Asthana, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2137 days.

(21) Appl. No.: 10/983,876

(22) Filed: Nov. 8, 2004

(51) Int. Cl.
*G06F 12/00* (2006.01)
*G06F 13/00* (2006.01)
*G06F 13/28* (2006.01)
*G06F 17/00* (2006.01)
*G06F 11/00* (2006.01)
*G06F 11/16* (2006.01)

(52) U.S. Cl. ........ 711/111; 711/100; 711/112; 711/114; 711/147; 711/148; 711/154; 711/161; 711/162; 711/168; 707/674; 707/677; 707/681; 707/685; 707/686; 714/100; 714/2; 714/4.3; 714/6.2; 714/6.22; 714/6.23

(58) Field of Classification Search ................. None
See application file for complete search history.

(56) References Cited

U.S. PATENT DOCUMENTS

| | | | | |
|---|---|---|---|---|
| 4,965,719 A | * | 10/1990 | Shoens et al. | 711/100 |
| 5,774,643 A | * | 6/1998 | Lubbers et al. | 714/20 |
| 5,999,930 A | * | 12/1999 | Wolff | 707/8 |
| 6,145,066 A | | 11/2000 | Atkin | |
| 6,226,651 B1 | * | 5/2001 | Masuda et al. | 707/202 |
| 6,405,284 B1 | * | 6/2002 | Bridge | 711/114 |
| 6,671,705 B1 | * | 12/2003 | Duprey et al. | 707/204 |
| 6,820,098 B1 | | 11/2004 | Ganesh et al. | |
| 6,826,580 B2 | * | 11/2004 | Harris et al. | 707/202 |
| 7,139,931 B2 | * | 11/2006 | Horn | 714/6 |
| 7,225,307 B2 | | 5/2007 | Micka et al. | |
| 7,240,238 B2 | | 7/2007 | Yanai et al. | |
| 7,243,115 B2 | | 7/2007 | Manley et al. | |
| 7,260,739 B2 | | 8/2007 | Burton et al. | |
| 2003/0028695 A1 | * | 2/2003 | Burns et al. | 710/200 |
| 2003/0069889 A1 | * | 4/2003 | Ofek | 707/100 |
| 2003/0079083 A1 | * | 4/2003 | Lubbers et al. | 711/114 |
| 2004/0073831 A1 | | 4/2004 | Yanai et al. | |
| 2004/0143639 A1 | | 7/2004 | Rangan et al. | |
| 2005/0198453 A1 | | 9/2005 | Osaki | |
| 2006/0010299 A1 | | 1/2006 | Zhang et al. | |

OTHER PUBLICATIONS

"Vxmake(4)," HP-UX 11i Version 1.5 Reference vol. 5, Section 4, http://docs.hp.com/en/B9106-90011/, 2001, (17 pages).

* cited by examiner

*Primary Examiner* — Yaima Campos
*Assistant Examiner* — Marwan Ayash
(74) *Attorney, Agent, or Firm* — Robert C. Kowert; Meyertons, Hood, Kivlin, Kowert & Goetzel, P.C.

(57) ABSTRACT

System and method for distributing volume status information in a storage system. According to one embodiment, a system may include a plurality of volumes configured to store data, where the volumes are configured as mirrors of one another, and a plurality of hosts configured to access the plurality of volumes. A first one of the plurality of hosts may be configured to execute a mirror recovery process and to maintain a progress indication of the mirror recovery process, and the first host may be further configured to distribute the progress indication to another one or more of the plurality of hosts.

23 Claims, 8 Drawing Sheets

FIG. 8

SYSTEM AND METHOD FOR DISTRIBUTING VOLUME STATUS INFORMATION IN A STORAGE SYSTEM

BACKGROUND

1. Field of the Invention

This invention relates to data storage and, more particularly, to techniques for communicating information in storage systems.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

To provide for a degree of security against loss of critical data, for example due to a hardware or software failure, critical data may be stored on several volumes, where one volume is configured to mirror another. One of the mirrored volumes may thus provide a backup source of data in case another one of the mirrored volumes fails.

If a failure occurs during system operation, mirrored data volumes may not reflect the same data (i.e., may become inconsistent), for example if data is written to one mirrored volume but not another. In some cases, inconsistent mirrors may need to be resynchronized following a failure in order for applications to continue operating properly. However, preventing applications from using the mirrored volumes until they are completely resynchronized may result in large application downtimes or unacceptable performance degradation.

SUMMARY

Various systems and methods for distributing volume status information in a storage system are disclosed. According to one embodiment, a system may include a plurality of volumes configured to store data, where the volumes are configured as mirrors of one another, and a plurality of hosts configured to access the plurality of volumes. A first one of the plurality of hosts may be configured to execute a mirror recovery process and to maintain a progress indication of the mirror recovery process, and the first host may be further configured to distribute the progress indication to another one or more of the plurality of hosts.

In one specific implementation of the system, executing the mirror recovery process may include reading a data block at a current mirror recovery offset from a given one of the plurality of volumes, and responsively writing the data block to each of the plurality of volumes other than the given volume, where the current mirror recovery offset may be monotonic, and wherein the progress indication may include the current mirror recovery offset.

According to another embodiment, a system may include a plurality of volumes configured to store data, and a plurality of hosts configured to access the plurality of volumes, where a first one of the plurality of hosts is configured to distribute volume status information in addition to a lock indication to a second one of the plurality of hosts in response to receiving a distributed lock request from the second host.

A method is further contemplated, which in one embodiment may include storing data on a plurality of volumes, where the volumes are configured as mirrors of one another, executing a mirror recovery process, maintaining a progress indication of the mirror recovery process, and distributing the progress indication to one or more of a plurality of hosts configured to access the plurality of volumes.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Storage System Architecture

Figure 1:
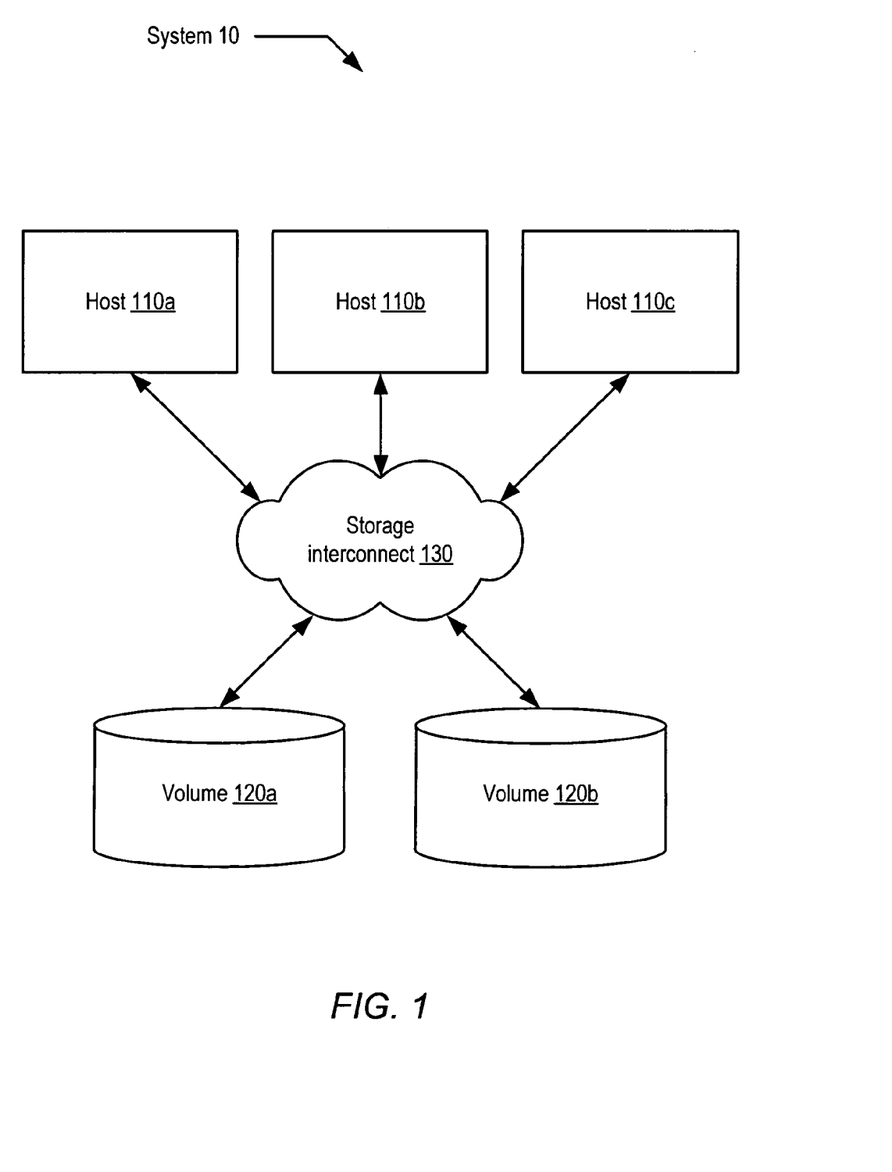
FIG. 1 is a block diagram illustrating one embodiment of a storage system.

FIG. 1 illustrates a storage system 10 according to one embodiment. In the illustrated embodiment, system 10 includes a plurality of hosts 110a-c configured to access a plurality of volumes 120a-b via storage interconnect 130.

Volumes 120 may be configured for data storage. Specifically, in one embodiment, each of volumes 120 may comprise a block storage device that may be presented directly for use by a block device consumer or client, such as an application (e.g., a database application) or a file system. Generally speaking, a block storage device may comprise a hardware or software entity that provides a collection of linearly addressed data blocks that can be read or written. For example, in one embodiment a given volume 120 may include a single disk drive configured to present all of its sectors as an indexed array of blocks. It is contemplated that any suitable type of storage device may be configured as a block storage device and presented as a volume 120. For example, potential block storage devices include fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a given volume 120 may comprise more than one block device. For example, several different block devices (such as disks) each having their own respective block address spaces may be mapped into a single block address space corresponding to a given volume 120. Such a mapping may also be referred to as storage or block virtualization, or simply as virtualization.

Data stored on a given volume 120 may be critical to the operation of one or more applications. For example, system 10 may be configured to provide storage for various enterprise functions, such as electronic commerce, inventory management, production control, customer contact and support information, or other functions for which data loss might create a substantial disruption to the enterprise. To increase the likelihood that a valid copy of critical data is available in case of a failure, in one embodiment, volume 120b may be configured as a mirror of volume 120a. That is, in one embodiment, upon an application issuing a write to a particular data block, the data block may be written to both volumes 120a-b. Further, the write operation may not be reported to the issuing application as complete until the data block has been successfully written to both volumes 120a-b. Under normal operating conditions, volume 120b may represent a complete copy of the data blocks stored on volume 120a at a given point in time. (For read operations, only one of volumes 120a-b needs to be accessed, and in some embodiments the volume 120 that is topologically or physically closest to the requesting application may service the read.) It is noted that in some embodiments, an arbitrary number of volumes 120 may be configured as minors of a given volume 120, and system 10 may include additional volumes 120 that are not configured as minors of other volumes.

Each of hosts 110 may be configured to access volumes 120. For example, hosts 110 may be configured to execute application and/or operating system software that generates read and write operations directed to specific data blocks, or ranges of blocks, stored by volumes 120. Alternatively, a host 110 may be configured to access volumes 120 on behalf of applications executing on a different system. In the illustrated embodiment, hosts 110 may be configured to communicate with volumes 120 via storage interconnect 130, which in various embodiments may comprise a local area network (LAN), a storage area network (SAN), or any other suitable type of interconnect.

In one embodiment, a host 110 may be configured as general-purpose computer system capable of executing one or more operating systems, applications, or other types of software. In some such embodiments, host 110 may be configured to run a version of software, also referred to as a volume manager, configured to perform volume management functions for one or more of volumes 120. For example, a host 110 may be configured to execute a version of VERITAS Cluster Volume Manager (CVM), VERITAS SAN Volume Manager (SANVM), or another suitable volume management product. Generally speaking, a volume manager may be configured to configure and coordinate access to one or more volumes 120 under management. For example, in one embodiment a volume manager may be configured to coordinate storage virtualization features mentioned above. Also, in one embodiment a volume manager may be configured to manage and coordinate the mirroring of volumes 120a-b. That is, such a volume manager may be aware of the existence and configuration of volume 120b as a mirror of volume 120a, may coordinate block write traffic received from volume clients such that writes are issued to both volumes 120a-b, and may report writes to requesting clients as complete only when the corresponding blocks have been successfully written to each of volumes 120a-b. An embodiment of host 220 configured to perform volume management functions may be illustrative of storage management devices 110 of FIG. 1.

Hosts 110 need not be general-purpose computers. In one embodiment, a host 110 may be configured as an intelligent storage management device, such as a SAN switch. For example, in one embodiment host 110c may be a SAN switch configured to provide high-bandwidth connectivity, such as via a Fibre Channel or high-bandwidth Ethernet interface, between one or more of volumes 120 and another device, such as another computer system (e.g., another host 110, an application server, etc.). SAN switches generally may be configured to provide crossbar-like connectivity between multiple devices seeking to access volumes 120 and volumes 120 themselves. In some embodiments, a host 110 configured as a SAN switch may also be configured to perform volume management functions. For example, in one embodiment a SAN switch may be configured to execute an embedded version of a volume manager configured to coordinate storage virtualization features, such as described above. Specifically, in one embodiment a SAN switch may be configured to manage and coordinate the mirroring of volumes 120a-b in a manner similar to that described above. Such embodiments of SAN switches may be referred to as "intelligent" or virtualization switches.

As an example, in one embodiment a virtualization SAN switch implemented as a host 110 may be configured to manage volumes 120 as mirrors independently of a volume client (such as an application executing on a different system). That is, SAN switch 210 may present a single, generic interface to mirrored storage to a volume client. The client may convey write requests to host SAN switch 110, which may responsively coordinate among volumes 120 to ensure that the writes are committed to each mirror volume. Such coordination may occur transparently to the volume client. Additionally, like a volume manager executing on a general-purpose computer, in some embodiments a virtualization SAN switch 210 may be configured to perform other volume management tasks, such as creating snapshots of volumes 120, implementing volume spanning and/or striping, or other types of storage virtualization.

It is contemplated that in some embodiments, different numbers and types of hosts 110 may be employed. Further, storage interconnect 130 may encompass multiple heterogeneous types of networks. For example, in one embodiment system 10 may include different groups of hosts 110 and volumes 120 interconnected by high-bandwidth LANs and/or SANs, where the groups are located at different physical sites interconnected by lower-bandwidth SAN or wide-area network (WAN) interconnects. Also, it is contemplated that in some embodiments multiple levels of storage virtualization may be employed. For example, in one embodiment multiple hosts 110 may be interposed between a volume client and the underlying block device(s) comprising the volume. In such and embodiment, a host 110 closer to the volume client may be configured to perform one level of storage virtualization, such as snapshot coordination, while a host 110 closer to volumes 120 may be configured to coordinate volume mirroring.

Failure Recovery

Under normal circumstances, in embodiments where volumes 120a-b are configured as mirrored volumes, a particular host 110 that generates a block write destined for volumes 120 may be configured to write that block to volume 120a as well as to volume 120b. However, in some instances, a failure may occur after a block has been written to one of mirrored volumes 120, but before the block has been correspondingly written to all mirrored volumes 120. For example, a host 110 may fail to complete a block write to all mirrored volumes 120 due to a software or hardware failure, or storage interconnect 130 may fail to transmit the block write from host 110 to one or more of volumes 120. Regardless of the cause, a failure to write a block to all mirrored volumes 120 may be referred to as a write failure.

In the event a data block is written to some but not all mirrored volumes 120, those volumes may be referred to as being in an inconsistent state or out of synchronization. In some cases, if an application were to attempt to read a data block from a set of inconsistent mirrored volumes 120, a different value may be returned depending on which of volumes 120 serviced the read (i.e., a volume 120 to which a write had occurred, or a volume 120 to which the write had not yet occurred prior to a data link failure). Consequently, in some embodiments, before further access is allowed to mirrored volumes 120 following a write failure, volumes 120 may be resynchronized to eliminate the possibility of reading inconsistent values from volumes 120.

One general method of resynchronizing or recovering an inconsistent set of mirrored volumes 120 is to read a data block from one mirrored volume 120 and to write that data block to each other mirrored volume 120, thus ensuring that the data block has the same value on each volume. (In one embodiment, during resynchronization the data block may also be written to the volume it was read from.) In some embodiments, each block of mirrored volumes 120 may be individually resynchronized. In other embodiments, a bitmap or log may be used to identify those individual blocks or regions (i.e., groups) of blocks for which writes were recently attempted. For example, a dirty region log (DRL) may be maintained in association with mirrored volumes 120 to track regions that were recently written to. When a write failure occurs, only those blocks or regions for which writes were attempted around the time of the write failure are likely to be inconsistent. Correspondingly, rather than unconditionally resynchronizing every block of mirrored volumes 120, in some embodiments the resynchronization may be conditioned upon the status of a bitmap or log indicating recent block writes.

In one embodiment, this general resynchronization method may be implemented by a mirror recovery process executed by a particular host 110. In such an embodiment, the host 110 executing the mirror recovery process may also be configured to maintain a progress indication of the mirror recovery process. For example, in one embodiment, data blocks within mirrored volumes 120 may occupy a linear block address space, and a given data block may be identified with an offset (i.e., a number of blocks) from the beginning or end of the block address space. Correspondingly, in one embodiment, the progress indication of the mirror recovery process may include a current mirror recovery offset, which may indicate the offset within the block address space of the last block resynchronized by the mirror recovery process. In such an embodiment, the current mirror recovery offset may be monotonic over time. That is, in various embodiments resynchronization may begin at a lower block address and monotonically increase through the block address space, or resynchronization may begin at a higher block address and monotonically decrease through the block address space.

In some embodiments, details regarding the configuration of mirrored volumes 120 may be available to a volume manager executing on hosts 110, but not necessarily to application software interacting with such a volume manager. For example, in some embodiments the number of minors comprising mirrored volumes 120, their specific device identifiers and the like may be managed transparently to applications by volume manager software. Such transparency may simplify applications, for example by allowing applications to deal with a more abstract storage model. However, in the case of mirror inconsistency, applications may need to be protected from the effects of inconsistency (e.g., two read operations returning different data for the same block) until mirror recovery is completed.

Since preventing applications from accessing mirrored volumes 120 until mirror recovery is complete may unacceptably degrade system performance, in some embodiments, a host 110 may be configured to place mirrored volumes 120 into a mode of operation denoted "read-writeback mode" or "rwback mode." In one embodiment, when mirrored volumes 120 are in rwback mode, any read operation directed to mirrored volumes 120 results in resynchronization of the associated block or blocks by reading the blocks from one of mirrored volumes 120 and writing the read value to the other mirrored volume(s) 120, as described above. Thus, in rwback mode, reads operations have the side effect of write operations. Further, in some embodiments, conversion of reads to writes in rwback mode may be transparent to an application. That is, an application may not be aware that mirrored volumes 120 are in rwback mode at all, or if it is so aware, an application may not be aware of how many volumes 120 are involved, which volume 120 is selected for the read operation, etc.

In some embodiments, the mirror recovery process described above may be implemented by placing mirrored volumes 120 into rwback mode and executing an iterative loop that monotonically issues read operations to either the entire block address space of mirrored volumes 120, or only to those regions indicated as dirty as described above. In such embodiments, host 110 may be configured to convert the read operations issued by the mirror recovery process to read-writeback operations as described above (e.g., via a volume manager). In some embodiments, a host 110 placing mirrored volumes 120 into rwback mode may be a transactional and persistent event among all hosts 110 having access to mirrored volumes 120. That is, entry into rwback mode may be coordinated such that all hosts 110 atomically receive notice of the mode change, and subsequently, all hosts 110 may treat mirrored volumes 120 as being in rwback mode until being notified otherwise. In some embodiments, transactionality or atomicity of entry into rwback mode may be implemented by serializing or quiescing read and write activity to volumes 120 from all hosts 110.

Converting a read operation into a read-writeback operation as described above may diminish the block read performance of applications issuing reads to a volume in rwback mode, as the read-writeback operation entails more activity than a simple read operation. It is noted, however, that the progress indication of the mirror recovery process may distinguish between those blocks of mirrored volumes 120 that have already been recovered by the mirror recovery process and those blocks that have not yet been recovered. For example, in one embodiment, a block address that is less than the current mirror recovery offset may have been recovered, while a block address that is greater than or equal to the current recovery offset may not have been recovered. (As noted above, in other embodiments the recovery process may execute in a monotonically decreasing fashion, which may reverse the sense of this test. Also, in some embodiments the block corresponding to the current recovery offset itself may be included in the set of blocks that have already been recovered.)

In one embodiment, the host 110 on which the mirror recovery process executes may be configured to distribute a progress indication associated with the mirror recovery process to other hosts 110 that have access to mirrored volumes 120. For example, the current recovery offset may be distributed among hosts 110. In such an embodiment, other hosts 110 may be configured to not convert a read operation directed to a given block into a read-writeback operation dependent on the status of the given block with respect to the progress indication (e.g., the comparison of the address of the given block to the current recovery offset). Not converting read operations directed to already-recovered blocks may improve application performance in some embodiments.

Figure 2:
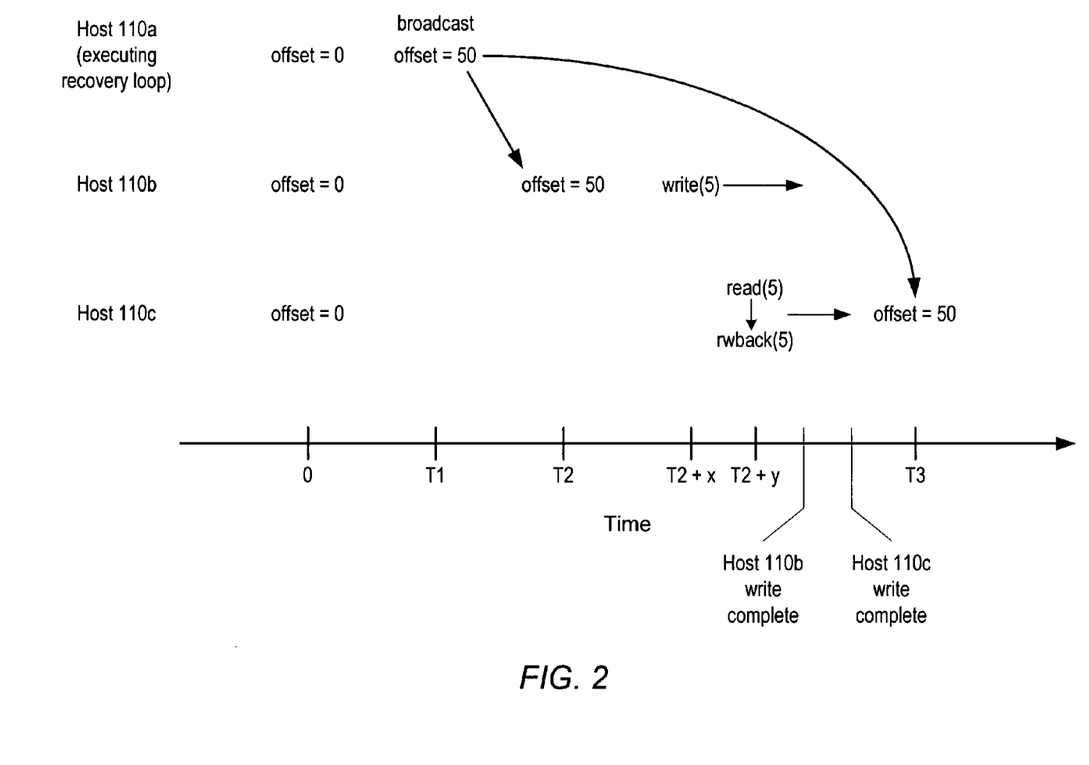
FIG. 2 is a timing diagram illustrating one embodiment of a race condition arising from broadcast distribution of a mirror recovery offset.

However, in some instances, distributing a progress indication to other hosts 110 by simply broadcasting the progress indication to all hosts 110 may result in incorrect system behavior, as illustrated in the timing diagram shown in FIG. 2. In FIG. 2, mirrored volumes 120 are in rwback mode, and host 110a is configured to execute the mirror recovery process for mirrored volumes 120 and to maintain a progress indication of the mirror recovery process that includes a current mirror recovery offset. Further, hosts 110b-c are configured to maintain a local copy of the current mirror recovery offset as conveyed from host 110a. Initially, at time 0 (i.e., before the mirror recovery process begins executing) the mirror recovery offset maintained by each of hosts 110a-c is equal to 0. At a later time T1, the recovery process executing on host 110a updates the current recovery offset to 50 (indicating, for example, that blocks 0 through 50 have been recovered) and broadcasts the updated offset to hosts 110b-c. However, due to differences in execution speed and/or workload of hosts 110a-c, network bandwidth of storage interconnect 130, or other factors, the updated offset may arrive at hosts 110b-c at two different times. In the illustrated embodiment, the updated offset arrives at hosts 110b-c at times T2 and T3, respectively, where T3 is later than T2.

At a time T2+x that is earlier than T3, host 110b receives a write operation directed to block 5. Since the local copy of the current recovery offset at host 110b at time T2+x is 50, host 110b may assume that block 5 has already been recovered (i.e., that a read operation to block 5 will not get converted into a read-writeback operation) and may proceed to write to block 5 of mirrored volumes 120. (In some embodiments, block read and write operations may be specified for multiple sequential blocks by specifying a block offset and length. Thus, for example, an operation to write 10 blocks beginning at block 5 may specify an offset of 5 and a length of 10.) Further, the write operation on host 110b may occur over an interval of time subsequent to time T2+x. For example, it may take different amounts of time for the write to propagate from host 110b to each of volumes 120a-b, and the write may occur to one of volumes 120a-b before the other.

At a time T2+y that is earlier than T3 and that occurs during the interval during which host 110b is writing to mirrored volumes 120, host 110c receives a read operation directed to block 5. However, at time T2+y, the updated current recovery offset has not yet been received at host 110c from host 110a, and host 110c's local copy of the offset is still at 0. Therefore, host 110c assumes that block 5 has not yet been recovered, and converts the read operation directed to block 5 into a read-writeback operation. However, because a write operation to block 5 is underway from host 110b, a race condition may exist between the write from host 110b and the write from host 110c. For example, host 110b may write to block 5 of volume 110b before host 110c does, but due to asymmetric propagation delays, host 110b may write to block 5 of volume 110a after host 110c does. Consequently, after both writes from hosts 110b-c complete, block 5 may have different values on volumes 110a-b, resulting in a mirror inconsistency that, as noted above, may lead to incorrect system and/or application behavior.

Distributed Lock Piggybacking

In one embodiment, the aforementioned rwback mode race condition may be efficiently eliminated through the use of a distributed locking scheme among hosts 110. Generally speaking, a distributed locking scheme in a multiple-host environment may require that a requesting host 110, seeking to perform certain types of volume input/output (I/O) operations (e.g., read or write operations) under certain conditions, first obtain a lock. For example, in one embodiment, a requesting host 110 seeking to perform a write operation to M data blocks beginning at offset N of mirrored volumes 120 may first request a lock before beginning the write operation. If another host 110 currently holds a lock that encompasses any portion of the requested range (e.g., blocks N through N+M−1), the lock may not be granted, and requesting host 110 may make another attempt to acquire a lock later.

A distributed locking scheme may include messaging between a requesting host 110, and another host 110 that coordinates lock activity for the volume 120 targeted by the requesting host. For example, in a clustered-host embodiment (e.g., an embodiment in which hosts 110 are configured to run the CVM volume manager), one host 110 may be designated the lock master for each other host 110, and all hosts 110 may direct their lock request messages to the lock master host 110. In other asymmetrically-distributed embodiments (e.g., an embodiment in which hosts 110 are configured to run the SANVM volume manager), a volume server distinct from hosts 110 may be configured as the lock master, or the lock-mastering function may be distributed among the hosts 110. For example, different hosts 110 may manage the coordination of lock activity for different volumes 120, or for different portions of the block address space of a given volume 120.

In some embodiments, the messaging required to communicate a lock request to a lock master may add latency to a given volume operation. For example, even if a requesting host 110 also happens to be the lock master for a particular request, inter-process communication local to the requesting host 110 may still add some overhead to the operation. If messaging between hosts 110 is required, network latency may also be incurred. Thus, in some embodiments, only a subset of possible volume I/O operations may be coordinated using locks. For example, in one embodiment hosts 110 may be configured to assume that during a normal mode of operation of mirrored volumes 120, applications will coordinate read and write activity, such that distributed lock messaging among hosts 110 is not required. However, during a rwback mode of operation, a read operation may potentially be converted to write operations (i.e., read-writeback operations) without the knowledge of the application issuing the read operation, as described above. Thus, in one embodiment, during a rwback mode of operation, reads and writes to mirrored volumes 120 may be coordinated using distributed locks.

As previously noted, the overhead of unnecessarily converting a read operation to a read-writeback operation may be avoided in some embodiments by distributing the current mirror recovery offset to the various hosts 110 that are configured to access mirrored volumes 120. In one embodiment, the current mirror recovery offset may be distributed consistently among hosts 110, avoiding the race condition illustrated in FIG. 2, by distributing the current recovery offset in response to a lock request. That is, the current recovery offset may be "piggybacked" onto the response to a lock request. Additionally, in embodiments where hosts 110 are configured to maintain a local copy of the current recovery offset, the local copy of the recovery offset may be used to optimize the requesting and releasing of distributed locks, so that the overhead associated with lock operations may be reduced.

Figure 3:
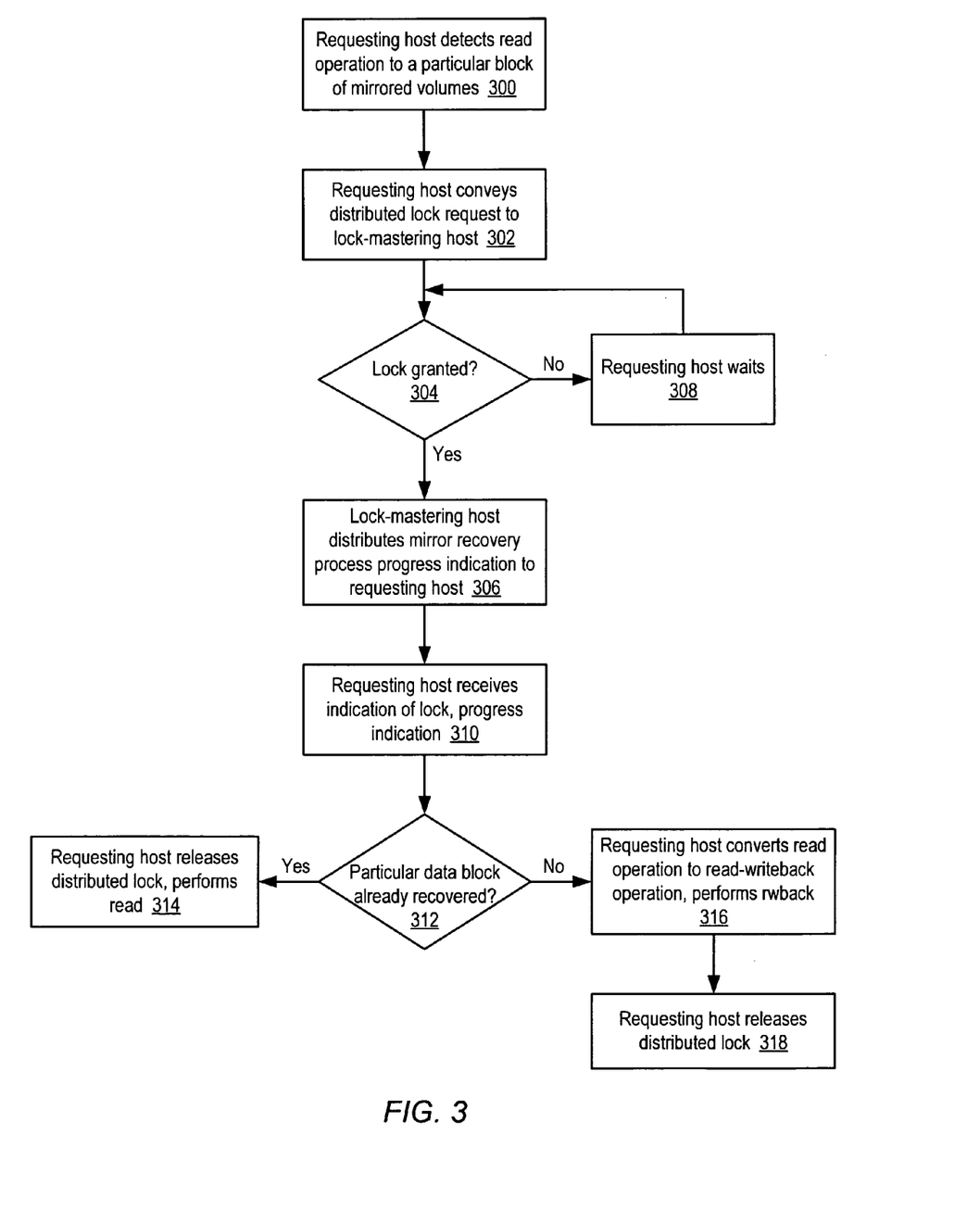
FIG. 3 is a flow diagram illustrating one embodiment of a method of distributing a current mirror recovery offset in response to a lock request for a read operation.

When mirrored volumes 120 are configured in a rwback mode of operation, a read operation to a block may be converted to a write operation dependent upon the address of the block relative to the current recovery offset at a given node. Because reads in rwback mode may have the effect of writes, distributed locks may be obtained for reads and held until a determination is made as to whether the targeted block has been recovered. One embodiment of a method of distributing a current mirror recovery offset in response to a lock request for a read operation is illustrated in FIG. 3. Referring to FIG. 1 and FIG. 3, operation begins in block 300 where a requesting host, such as host 110c, detects a read operation to a particular data block stored by a plurality of mirrored volumes 120. In one embodiment, mirrored volumes 120 may be configured in a rwback operation mode by a previous operation, as described above.

In the illustrated embodiment, subsequent to detecting the read operation, requesting host 110c is configured to convey a distributed lock request to another host, such as host 110a, that is configured to perform a lock-mastering function as described above (block 302). (It is noted that any of hosts 110 may be configured as the requesting and lock-mastering hosts in different embodiments, and in some cases the requesting and lock-mastering hosts may be the same host 110.) In some embodiments, the lock request may comprise a message sent from the requesting host 110c to the lock-mastering host 110a, which may include information such as the offset of the first block, as well as the number of contiguous blocks from the first block, for which the lock is requested.

The lock-mastering host 110a is configured to receive the distributed lock request from the requesting host 110c, and to responsively determine whether to grant the requested lock (block 304). In one embodiment, if a previously granted and still outstanding (i.e., unreleased) distributed lock exists that overlaps the region of blocks specified by the current lock request, the lock request may be denied. For example, the read operation may be targeted to an unrecovered block to which a read or write operation is already in progress. Also, in one embodiment, if a particular host 110 holds a local lock (described below) in conjunction with local write activity (e.g., to an already-recovered block), the distributed lock request may be denied.

If the lock request is granted, the lock-mastering host 110a is configured to responsively distribute a progress indication associated with a mirror recovery process that is operating on mirrored volumes 120 to the requesting host 110c (block 306). For example, the progress indication may include a current mirror recovery offset, and the lock-mastering host 110a may be configured to append this offset to a message indicative of the lock grant that is returned to requesting host 110c. It is noted that the lock-mastering host 110a may also be the host executing the mirror recovery process, but it need not be. In embodiments where a different host 110 executes the mirror recovery process, lock-mastering host 110a may be configured to obtain the progress indication from that host 110, or to cause that host 110 to convey the progress indication to the requesting host 110c along with notice of the lock grant.

If the lock request is denied, in one embodiment the requesting host 110a may be configured to wait (i.e., to block execution of the requesting process) until the lock is granted (block 308). For example, in one embodiment the lock-mastering host 110a may be configured to queue lock requests and grant them in turn as previously granted locks are released. In such an embodiment, lock-mastering host 110a may not convey any response to the requesting host 110c until the lock has been granted. In other embodiments, if the lock is not granted when requested, lock-mastering host 110a may be configured to explicitly notify the requesting host 110c of the denial, in which case the requesting host 110c may internally queue the lock request and reattempt it at a later time. In some embodiments where lock-mastering host 110a is configured to send indications of lock denial to requesting hosts, it may further append the progress indication to the lock denial indication. Such appending may be useful, for example, if a requesting host 110c maintains a local copy of the current recovery offset, as described in conjunction with the description of FIG. 4 below.

Subsequent to a grant of a distributed lock, the requesting host 110c receives an indication of the distributed lock as well as the progress indication distributed by (or on behalf of) the lock-mastering host 110a (block 310). The requesting host 110c then determines whether a particular data block targeted by the read operation has been recovered by the mirror recovery process, where this determination includes comparing a block offset specified by the read operation to the current mirror recovery offset included in the received progress indication (block 312). For example, the requesting 110c may numerically compare an offset of a block targeted by the read operation to the current recovery offset, and determine that the targeted block has been recovered if the targeted block offset is less than the current recovery offset. (As noted previously, in embodiments where the mirror recovery process proceeds in a monotonically decreasing fashion, the direction of the numerical comparison may be reversed. Also, in various embodiments, the block specified by the current recovery offset may or may not have been recovered itself, depending on implementation of the mirror recovery process.)

In response to determining that a particular data block targeted by the read operation has been recovered by the mirror recovery process, the requesting host 110c releases the distributed lock for that particular data block and performs the read operation (block 314). In response to determining that a particular data block has not been recovered, the requesting host 110c is configured to convert the read operation to that data block into a read-writeback operation, as described previously (block 316). Subsequent to completion of the read-writeback operation, the distributed lock for that particular data block is released (block 318).

In some embodiments, if multiple blocks are specified by a read operation, the requesting host 110c may be configured to determine the recovery status of all of the blocks concurrently. In other embodiments, the requesting host 110c may sequentially apply steps 312-318 to each block in turn. Also, in some embodiments, distributed locks for multiple contiguous blocks may be granted indivisibly, such that the lock may not be released for one block until it can be released for all blocks subject to the lock. In some such embodiments, a distributed lock may be held until it is determined that all blocks subject to the lock have already been recovered, or until all read-writeback operations directed to such blocks have completed.

Figure 4:
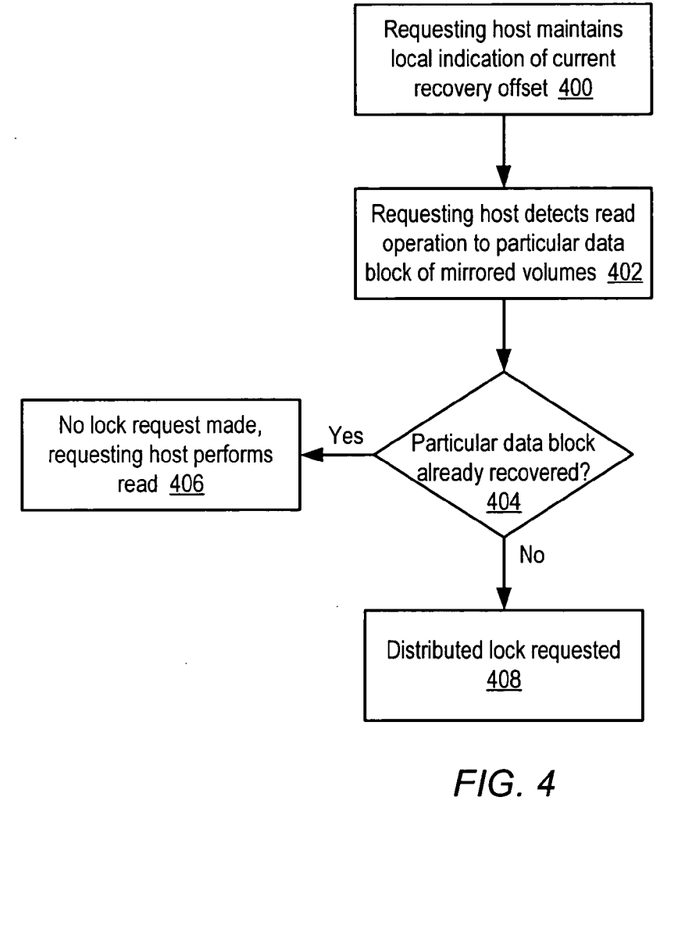
FIG. 4 is a flow diagram illustrating one embodiment of a method of requesting a distributed lock for a read operation using a local indication of a current mirror recovery offset.

As noted previously, requesting a distributed lock may incur a certain degree of overhead, which may degrade system performance if the distributed lock is unnecessary. In one embodiment, lock requesting may be optimized by configuring a requesting host 110 to maintain a local indication of the current mirror recovery offset. One embodiment of a method of requesting a distributed lock for a read operation using such a local indication is illustrated in FIG. 4. Referring collectively to FIG. 1 and FIG. 4, operation begins in block 400 where a requesting host, such as host 110c, is configured to maintain a local indication of the current recovery offset. For example, in one embodiment requesting host 110c may be configured to initialize a local copy of the recovery offset to a predetermined value, such as 0, prior to initiating any distributed lock requests. Upon making such requests, requesting host 110c may be configured to store of the current mirror recovery offset returned from a lock-mastering host 110a (such as shown in FIG. 3) in the local copy of the recovery offset.

The requesting host 110c then detects a read operation to a particular data block stored by mirrored volumes 120 (block 402). Subsequently, the requesting host 110c determines whether a particular data block targeted by the read operation has been recovered by the mirror recovery process, where this determination includes comparing a block offset specified by the read operation to the local indication of the current minor recovery offset (block 404). In some embodiments, this determination may be performed similarly to the determination described above in conjunction with the description of FIG. 3, except that for a given block, it may be made using a local indication of the current recovery offset prior to a distributed lock request for that given block.

Requesting host 110c may be configured to convey a distributed lock request to a lock-mastering host 110a dependent upon this determination. In the illustrated embodiment, if the determination using the local indication of the recovery offset indicates that the particular data block has already been recovered, no distributed lock request is made, and the read operation proceeds without being converted to a read-writeback operation (block 406). If the determination indicates that the particular data block has not yet been recovered, a distributed lock is requested (block 408). In one embodiment, operation may then proceed, for example, from block 302 of FIG. 3.

It is noted that in one embodiment combining the methods of FIG. 3 and FIG. 4, a read operation may only be converted into a read-writeback operation if a block targeted by the read operation is unrecovered according to the mirror recovery offset known to the lock-mastering host 110 at the time a distributed lock is granted. It is possible that the mirror recovery process may have already recovered the block at the time the read-writeback operation occurs, for example if the mirror recovery process is continuously running and the requested block is in the vicinity of the current recovery offset at the time the distributed lock request is made or granted. The converse case may also occur, in which the recovery process encounters a block that has been recovered by a previous read operation that was converted to a read-writeback operation. However, a recovery operation, such as a read-writeback operation, directed to a block that is already consistent may have no functional side effects.

In some embodiments where the mirror recovery process executes only on those blocks or regions indicated by a bitmap or log (such as a dirty region log), the mirror recovery process may be configured to skip the recovery of blocks that have been recovered by a previous read operation that was converted to a read-writeback operation. For example, in one embodiment, upon converting a read operation to a read-writeback operation, a requesting host 110c may be configured to clear a bitmap or log entry corresponding to the targeted block. Subsequently, when the mirror recovery process reaches the previously-recovered targeted block, it may skip recovering that block dependent upon the corresponding bitmap or log entry.

The dynamics of distributed locking, in some embodiments, may differ somewhat for write operations in contrast to read operations. For example, a write operation to a set of mirrored volumes 120 in rwback mode may be configured to write to all mirrored volumes 120 regardless of whether the targeted block has been recovered, whereas a read operation may be converted to a read-writeback operation dependent upon whether the targeted block has been recovered, as described above. However, in some embodiments the type of lock requested by a host 110 for a write operation may vary dependent upon the recovery status of a block targeted by the write operation.

Figure 5:
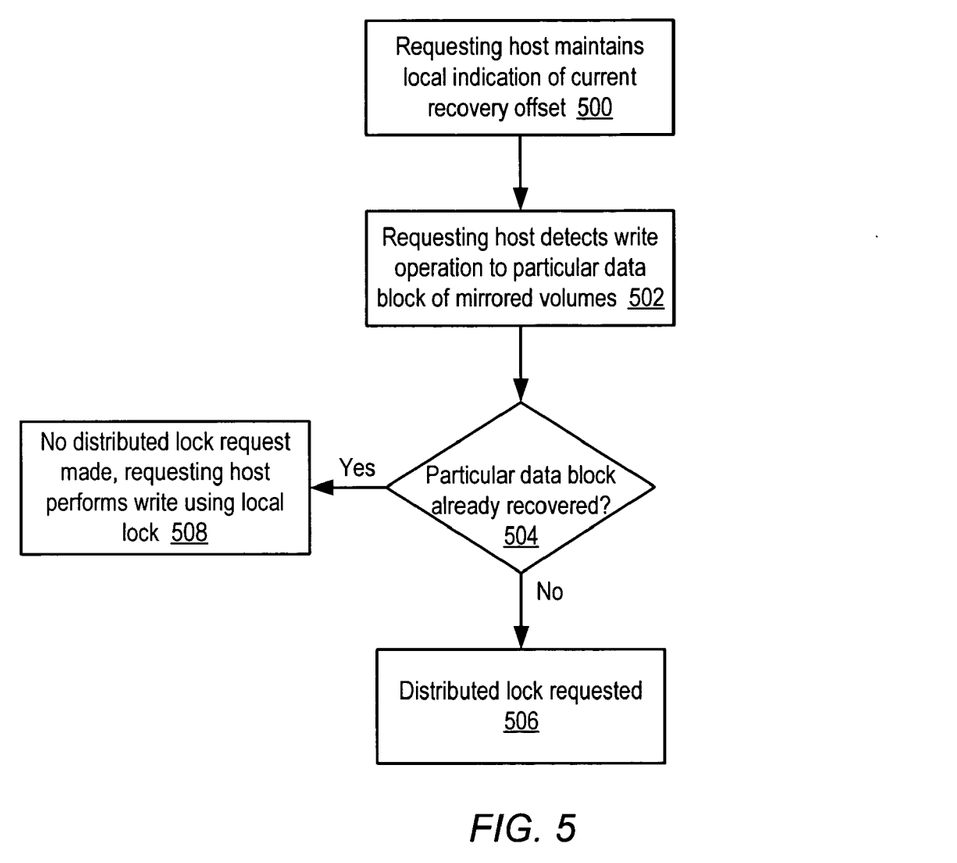
FIG. 5 is a flow diagram illustrating one embodiment of a method of requesting a lock for a write operation.

One embodiment of a method of requesting a lock for a write operation to a set of mirrored volumes 120 configured in a rwback mode of operation is illustrated in FIG. 5. Referring collectively to FIG. 1 and FIG. 5, operation begins in block 500 where a requesting host, such as host 110c, is configured to maintain a local indication of the current recovery offset. This step may in some embodiments be similar to step 400 of FIG. 4 described above.

The requesting host 110c then detects a write operation to a particular data block stored by mirrored volumes 120 (block 502). Subsequently, the requesting host 110c determines whether a particular data block targeted by the write operation has been recovered by the mirror recovery process, where this determination includes comparing a block offset specified by the read operation to the local indication of the current mirror recovery offset (block 504). In some embodiments, this determination may be performed similarly to the determination described above in step 404 of FIG. 4.

Requesting host 110c may be configured to convey a distributed lock request to a lock-mastering host 110a dependent upon this determination. In the illustrated embodiment, if the determination using the local indication of the recovery offset indicates that the particular data block has not yet been recovered, a distributed lock request is conveyed to a lock-mastering host 110a in a manner similar to the read case described above (block 506). In this case, a distributed lock may be needed, as a concurrent read operation to the same nonrecovered block may potentially be converted to a read-writeback operation, and a distributed lock may prevent such a read operation from proceeding while the write operation is outstanding.

If the determination indicates that the particular data block has already been recovered, in the illustrated embodiment the requesting host 110c may proceed with the write operation using a local lock (block 508). In one embodiment, a local lock may be configured to coordinate behavior that is local to the host 110 holding the lock. For example, if requesting host 110c holds a local lock on a given block for a particular write operation, other write operations originating from requesting host 110c may be prevented while the local lock is outstanding. However, a local lock may not require exchanging messages with a lock-mastering host 110a, and operations originating from hosts 110 other than the requesting host 110c generally may not be prevented by the local lock. (In some embodiments, existence of a local lock on a particular host 110 may prevent another host from obtaining a distributed lock, but in other embodiments local locks and distributed locks may not interact.)

In some embodiments, use of local locks may increase robustness of a host 110 by, for example, preventing rogue applications from issuing multiple uncoordinated writes to a single block, which might result in mirror inconsistency. However, in other embodiments, if the determination of block 506 indicates that a particular data block targeted by a write operation has already been recovered, the write operation may proceed without holding any type of lock. For example, in embodiments where it is assumed that applications coordinate their own write activity, and that reads during rwback mode attempt to obtain distributed locks for blocks not known to be recovered (e.g., as illustrated in FIGS. 3 and 4), then if a given block targeted by a write operation is known to have already been recovered, no read operation to the given block may result in a read-writeback operation, and locking may be unnecessary.

Figure 6:
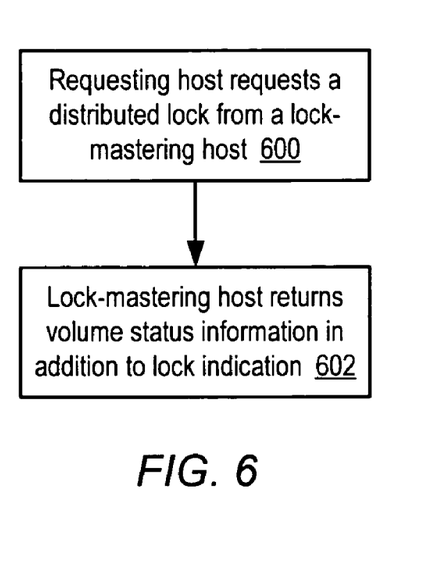
FIG. 6 is a flow diagram illustrating one embodiment of a method of distributing volume status information in response to a distributed lock request.

It is noted that in some embodiments, the information "piggybacked" onto a response to a lock request need not be a progress indication of a mirror recovery process. In fact, the information returned in addition to the lock indication need not be specific to mirror recovery at all. FIG. 6 illustrates one embodiment of a method of distributing volume status information in response to a distributed lock request. Referring collectively to FIG. 1 and FIG. 6, operation begins in block 600 where a requesting host 110 requests a distributed lock for one or more data blocks from a lock-mastering host 110. For example, a host 110 may request a lock for a read or a write operation to a volume 120. In some embodiments, volumes 120 may or may not be mirrored volumes, and may or may not be in rwback mode.

In response to receiving the distributed lock request, the lock-mastering host 110 is configured to return volume status information in addition to a lock indication to the requesting host 110 (block 602). For example, the indication returned may indicate lock grant or denial. In various embodiments, volume status information may include any suitable information regarding volumes 120 that is accessible to lock-mastering host 110. For example, volume status information may include configuration information, such as device identifiers, device mode information, and/or information regarding the configuration of virtualized storage objects (e.g., how such objects are structured). Volume status information may also include performance information, such as the number of read and/or write operations received by a given volume 120, peak utilization of a given volume 120, or any other suitable metric. Additionally, volume status information may include diagnostic information, such as the identities of devices or blocks for which an underlying hardware or software failure may have occurred. In some embodiments, volume status information returned in response to a lock request may include combinations of the aforementioned types of information, or different types of information. Also, it is noted that although volume status information need not necessarily include a progress indication of a mirror recovery process, in some embodiments, such an indication (such as the current mirror recovery offset discussed above) may be encompassed by volume status information.

Transactional Distribution of Recovery Offset

In some embodiments of system 10, distributed locks may not be supported, or for other reasons it may not be desirable or feasible to convey a progress indication of a mirror recovery process in response to a lock request. In an alternative embodiment, such a progress indication may be atomically or transactionally distributed among a plurality of hosts 110. Generally speaking, atomic or transactional distribution of a message among a plurality of hosts 110 may entail ordering the I/O activity of hosts 110 such that outstanding I/O activity is completed prior to distribution of the message, and no new I/O activity commences until distribution of the message is complete. In some embodiments, such atomic distribution of a message may be implemented by quiescing read and write operations to mirrored volumes 120 originating from hosts 110, and maintaining that state of I/O quiescence until the message has been distributed to all hosts 110.

For example, in one embodiment, before atomically distributing a mirror recovery process progress indication, the distributing host 110 executing the mirror recovery process may be configured to issue a message to each other host 110 instructing those hosts not to initiate new I/O, and to notify the distributing host 110 once all outstanding I/O to mirrored volumes 120 is complete. After the distributing host 110 receives such notification from all hosts 110, it may distribute the progress indication to all hosts 110. In some embodiments, upon receiving an acknowledgement of receipt of the progress indication from each of hosts 110, the distributing host 110 may be configured to issue another message indicating that hosts 110 may exit the quiescent state and resume I/O to mirrored volumes 120. In other embodiments, the precise interaction of distributing host 110 and the other hosts 110 may vary in any suitable way, provided that the distributed message is appropriately synchronized with I/O traffic of hosts 110.

Atomically distributing a progress indication, such as a current mirror recovery offset, may prevent the race condition illustrated in FIG. 2. However, quiescing host 110 I/O activity may negatively impact application performance. Thus, in one embodiment, a distributing host 110 may be configured to take additional factors into account when determining the frequency with which to atomically distribute a progress indication. For example, distributing host 110 may be configured to distribute the mirror recovery progress indication at intervals dependent upon a certain number of blocks having been recovered or a certain fraction of the mirror recovery process having been completed. In some embodiments, distributing host 110 may adjust the distribution interval dependent upon the degree of I/O activity occurring among hosts 110. For example, during periods of high I/O activity, distributing host 110 may postpone distribution of the progress indication.

Figure 7:
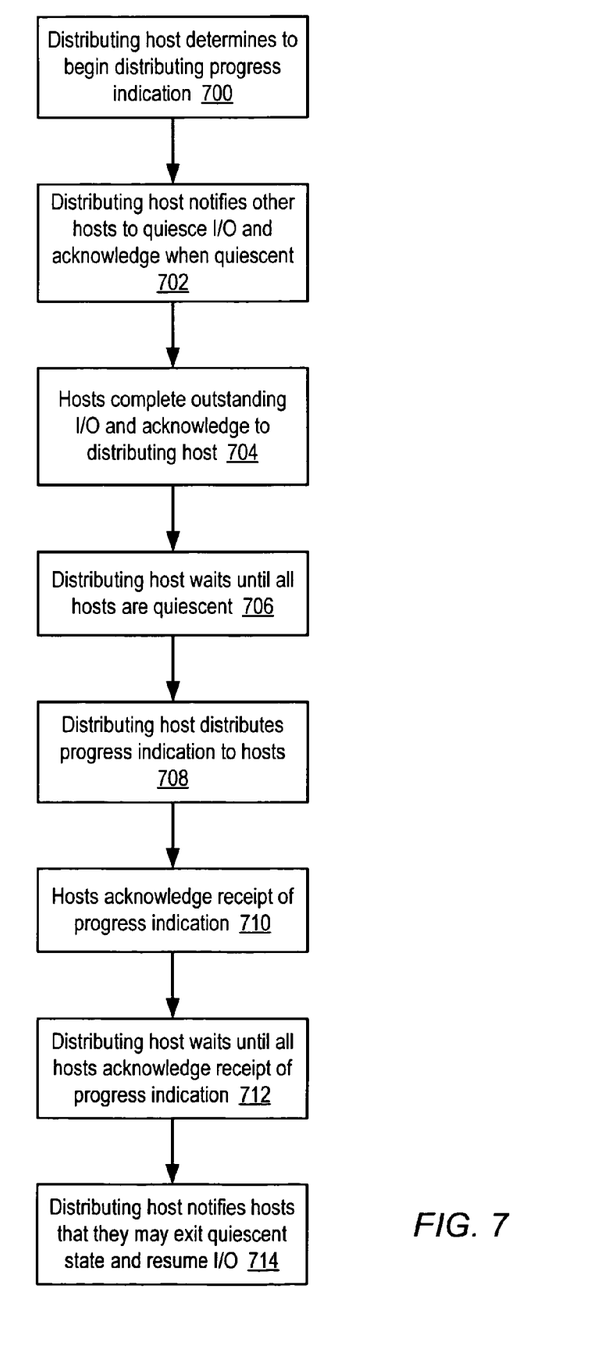
FIG. 7 is a flow diagram illustrating one embodiment of a method of atomically distributing a progress indication to a plurality of hosts.

One embodiment of a method of atomically distributing a progress indication among a plurality of hosts 110 is illustrated in FIG. 7. Referring collectively to FIG. 1 and FIG. 7, operation begins in block 700 where a distributing host 110 determines to begin distributing the progress indication at a given time. As mentioned above, in various embodiments this determination may take into account the progress indication itself (e.g., distribution occurs after every 100,000 blocks are recovered, or after every 25% of mirrored volumes 120 is recovered) as well as the current state of I/O activity within system 10, or other suitable factors.

Once distributing host 110 determines that the progress indication should be distributed among hosts 110, it notifies hosts 110 to quiesce their outstanding I/O and to acknowledge when they have entered a quiescent state (block 702). Subsequently, hosts 110 complete their outstanding I/O and notify distributing host 110 that they have done so (block 704).

Distributing host 110 subsequently determines whether all hosts 110 have entered a quiescent state (block 706). If not, distributing host 110 may wait until this is the case. Otherwise, distributing host 110 distributes the progress indication among hosts 110 (block 708) which acknowledge receipt of the progress indication (block 710). Distributing host 110 may once again wait until all hosts 110 have acknowledged receipt (block 712) and subsequently indicate to hosts 110 that they may exit the quiescent state and resume I/O (block 714).

Exemplary Computer-Accessible Medium

Figure 8:
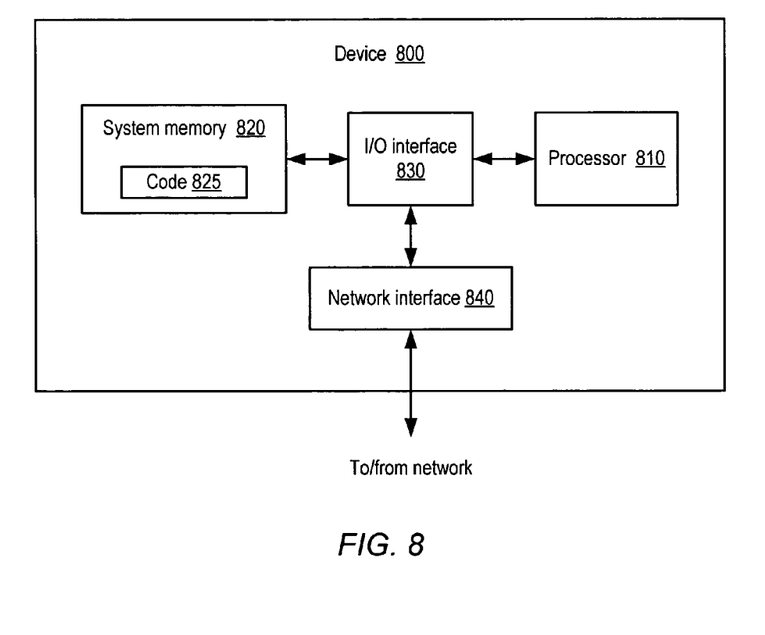
FIG. 8 is a block diagram illustrating one embodiment of a device including a computer-accessible medium.

It is contemplated that in some embodiments, any of the methods or techniques described above may be implemented as program instructions and data capable of being stored or conveyed via a computer-accessible medium. Such program instructions may be executed to perform a particular computational function, such as volume management tasks, storage virtualization tasks, operating system functionality, applications, and/or any suitable variants of the methods of data block resynchronization and storage management device selection described above. One embodiment of a storage management device including a computer-accessible medium is illustrated in FIG. 8. In the illustrated embodiment, device 800 includes a processor 810 coupled to a system memory 820 via an input/output (I/O) interface 830. Device 800 further includes a network interface 840 coupled to I/O interface 830. In some embodiments, device 800 may be illustrative of one or more of hosts 110. Specifically, in various embodiments device 800 may be configured as a general-purpose computer, or as an embedded or dedicated device, such as a SAN switch.

Processor 810 may be any suitable processor capable of executing instructions. For example, in various embodiments processor 810 may be a general-purpose or embedded processor implementing any of a variety of instruction set architectures (ISAs), such as the x86, PowerPC, SPARC, or MIPS ISAs, or any other suitable ISA.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 820 as code 825.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between device 800 and other devices attached to a network. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD-ROM coupled to device 800 via I/O interface 830. A computer-accessible medium may also include any volatile or non-volatile media such as RAM (e.g. SDRAM, DDR SDRAM, RDRAM, SRAM, etc.), ROM, etc, that may be included in some embodiments of device 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although the embodiments above have been described in considerable detail, numerous variations and modifications will become apparent to those skilled in the art once the above disclosure is fully appreciated. It is intended that the following claims be interpreted to embrace all such variations and modifications, and accordingly, the specifications and drawings are to be regarded in an illustrative rather than a restrictive sense.

What is claimed is:

1. A system, comprising:
   a plurality of volumes configured to store data, wherein said volumes are configured as mirrors of one another; and
   a plurality of hosts configured to access said plurality of volumes;
   wherein a first one of said plurality of hosts is configured to execute a mirror recovery process with respect to said plurality of volumes and to maintain a progress indication of said mirror recovery process;
   wherein said first host is further configured to distribute said progress indication to another one or more of said plurality of hosts including a second host; and
   wherein said second host is configured to:
      detect a read operation directed to a particular data block stored by said plurality of volumes;
      dependent upon said progress indication distributed by said first host, determine whether said particular data block has been recovered by said mirror recovery process; and
      in response to determining that said particular data block has not been recovered by said mirror recovery process, convert said read operation into a read-writeback operation, wherein said read-writeback operation is operable both to read a data value corresponding to said particular data block from a given one of said plurality of volumes and to write said data value to each other one of said plurality of volumes.

2. The system as recited in claim 1, wherein to execute said mirror recovery process, said first host is further configured to:
   read a data block at a current mirror recovery offset from a given one of said plurality of volumes; and
   in response to reading said data block, write said data block to each of said plurality of volumes other than said given volume;
   wherein said current mirror recovery offset is monotonic; and
   wherein said progress indication comprises said current mirror recovery offset.

3. The system as recited in claim 2, wherein said first host is further configured to grant a distributed lock to said second one of said plurality of hosts, and wherein said first host is further configured to both grant said distributed lock and distribute said progress indication to said second host in response to receiving a distributed lock request corresponding to said particular block from said second host.

4. The system as recited in claim 3, wherein said second host is further configured to:
  in response to conveying said distributed lock request to said first host, receive an indication of said distributed lock and said progress indication distributed from said first host; and
  in response to determining that said particular data block has been recovered by said mirror recovery process, release said distributed lock and perform said read operation; wherein to determine whether said particular data block has been recovered, said second host is further configured to compare an offset specified by said read operation to said current mirror recovery offset included in said progress indication.

5. The system as recited in claim 3, wherein said second host is further configured to:
  maintain a local indication of said current mirror recovery offset; and
  convey said distributed lock request to said first host dependent upon whether said particular data block has been recovered by said mirror recovery process, wherein to determine whether said particular data block has been recovered, said second host is further configured to compare an offset specified by said read operation to said local indication of said current mirror recovery.

6. The system as recited in claim 3, wherein said second host is further configured to:
  maintain a local indication of said current mirror recovery offset;
  subsequent to detecting a write operation to a given data block stored by said plurality of volumes, determine whether said given data block has been recovered by said mirror recovery process, wherein to determine whether said given data block has been recovered, said second host is further configured to compare an offset specified by said write operation to said local indication of said current mirror recovery offset; and
  in response to determining that said given data block has not yet been recovered, convey a distributed lock request corresponding to said given data block to said first host.

7. The system as recited in claim 6, wherein said second host is further configured to proceed with said write operation using a local lock instead of a distributed lock in response to determining that said given data block has been recovered.

8. The system as recited in claim 1, wherein said first host is further configured to atomically distribute said progress indication to each other one of said plurality of hosts, wherein to atomically distribute said progress indication, said first host is further configured to quiesce accesses to said plurality of volumes originating from said plurality of hosts until distribution of said progress indication is complete.

9. A method, comprising:
  storing data on a plurality of volumes, wherein said volumes are configured as mirrors of one another;
  a first one of a plurality of hosts executing a mirror recovery process with respect to said plurality of volumes;
  said first host maintaining a progress indication of said mirror recovery process;
  said first host distributing said progress indication to one or more of said plurality of hosts, including a second host, configured to access said plurality of volumes;
  said second host detecting a read operation directed to a particular data block stored by said plurality of volumes;
  dependent upon said progress indication distributed by said first host, said second host determining whether said particular data block has been recovered by said mirror recovery process; and
  in response to determining that said particular data block has not been recovered by said mirror recovery process, said second host converting said read operation into a read-writeback operation, wherein said read-writeback operation is operable both to read a data value corresponding to said particular data block from a given one of said plurality of volumes and to write said data value to each other one of said plurality of volumes.

10. The method as recited in claim 9, wherein said first host executing said mirror recovery process comprises:
  reading a data block at a current mirror recovery offset from a given one of said plurality of volumes; and
  in response to said reading, writing said data block to each of said plurality of volumes other than said given volume;
  wherein said current mirror recovery offset is monotonic; and
  wherein said progress indication comprises said current mirror recovery offset.

11. The method as recited in claim 10, further comprising:
  said first host granting a distributed lock to a second one of said plurality of hosts and distributing said progress indication to said second host, wherein both granting said distributed lock and distributing said progress indication occur in response to receiving a distributed lock request corresponding to said particular block from said second host.

12. The method as recited in claim 11, further comprising:
  in response to conveying said distributed lock request to said first host, said second host receiving an indication of said distributed lock and said progress indication distributed from said first host; and
  in response to determining that said particular data block has been recovered by said mirror recovery process, said second host releasing said distributed lock and performing said read operation, wherein determining whether said particular data block has been recovered comprises said second host comparing an offset specified by said read operation to said current mirror recovery offset included in said progress indication.

13. The method as recited in claim 11, further comprising:
  said second host maintaining a local indication of said current mirror recovery offset; and
  said second host conveying said distributed lock request to said first host dependent upon determining whether said particular data block has been recovered by said mirror recovery process, wherein determining whether said particular data block has been recovered comprises said second host comparing an offset specified by said read operation to said local indication of said current mirror recovery.

14. The method as recited in claim 11, further comprising:
  said second host maintaining a local indication of said current mirror recovery offset;
  subsequent to detecting a write operation to a given data block stored by said plurality of volumes, said second host determining whether said given data block has been recovered by said mirror recovery process, wherein determining whether said given data block has been recovered comprises said second host comparing said offset specified by said write operation to said local indication of said current mirror recovery offset; and in response to determining that said given data block has not yet been recovered, said second host conveying a distributed lock request corresponding to said given data block to said first host.

15. The method as recited in claim 14, further comprising said second host proceeding with said write operation using a local lock instead of a distributed lock in response to determining that said given data block has been recovered.

16. The method as recited in claim 9, further comprising said first host atomically distributing said progress indication to each other one of said plurality of hosts, wherein atomically distributing said progress indication comprises quiescing accesses to said plurality of volumes originating from said plurality of hosts until distribution of said progress indication is complete.

17. A computer-accessible storage medium, comprising program instructions, wherein the program instructions are computer-executable to implement:
   storing data on a plurality of volumes, wherein said volumes are configured as mirrors of one another;
   a first one of a plurality of hosts executing a mirror recovery process respect to said plurality of volumes;
   said first host maintaining a progress indication of said mirror recovery process;
   said first host distributing said progress indication to one or more of a plurality of hosts, including a second host, configured to access said plurality of volumes;
   said second host detecting a read operation directed to a particular data block stored by said plurality of volumes;
   dependent upon said progress indication distributed by said first host, said second host determining whether said particular data block has been recovered by said mirror recovery process; and
   in response to determining that said particular data block has not been recovered by said mirror recovery process, said second host converting said read operation into a read-writeback operation, wherein said read-writeback operation is operable both to read a data value corresponding to said particular data block from a given one of said plurality of volumes and to write said data value to each other one of said plurality of volumes.

18. The computer-accessible storage medium as recited in claim 17, wherein to implement said first host executing said mirror recovery process, the program instructions are further computer-executable to implement:
   reading a data block at a current mirror recovery offset from a given one of said plurality of volumes; and
   in response to said reading, writing said data block to each of said plurality of volumes other than said given volume;
   wherein said current mirror recovery offset is monotonic; and
   wherein said progress indication comprises said current mirror recovery offset.

19. The computer-accessible medium as recited in claim 18, wherein the program instructions are further computer-executable to implement said first host granting a distributed lock to a given one of said plurality of hosts and to distributing said progress indication to said given host, and wherein both granting said distributed lock and distributing said progress indication occur in response to receiving a distributed lock request corresponding to said particular block from said given host.

20. A system, comprising:
   a plurality of volumes configured to store data, wherein said volumes are configured as mirrors of one another; and
   a plurality of hosts configured to access said plurality of volumes;
   wherein a first one of said plurality of hosts is configured to distribute a progress indication of a mirror recovery process in addition to a lock indication corresponding to a particular data block stored by said plurality of volumes to a second one of said plurality of hosts in response to receiving a particular distributed lock request corresponding to said particular data block from said second host;
   wherein said progress indication comprises an indication of data blocks stored by said plurality of volumes that have already been recovered by said mirror recovery process; and
   wherein said second host is configured to generate one or more additional distributed lock requests for data blocks stored by said plurality of volumes dependent upon said progress indication returned in response to said particular distributed lock request.

21. The system as recited in claim 20, wherein said progress indication comprises a current mirror recovery offset.

22. The system as recited in claim 20, wherein said second host is further configured to:
   subsequent to receiving said progress indication, detect a read operation to a given data block stored by said plurality of volumes;
   dependent upon said progress indication, determine whether said given data block has been recovered by said mirror recovery process; and
   in response to determining that said given data block has not been recovered by said mirror recovery process, convert said read operation into a read-writeback operation.

23. The system as recited in claim 20, wherein said second host is further configured to:
   subsequent to receiving said progress indication, detect a write operation to a given data block stored by said plurality of volumes;
   dependent upon said progress indication, determine whether said given data block has been recovered by said mirror recovery process; and
   in response to determining that said given data block has not yet been recovered by said mirror recovery process, convey a distributed lock request corresponding to said given data block to said first host.

* * * * *